Patented Oct. 4, 1938

2,131,925

UNITED STATES PATENT OFFICE 2,131,925

PURIFICATION OF ORGANIC COMPOUNDS

Virgil Waldo Ware, Parlin, N. J., assignor to E. I. du Pont de Nemours & Company, Wilmington, Del., a corporation of Delaware No Drawing. Application February 6, 1937, Serial No. 124,524

2 Claims. (Cl. 260—708)

This invention relates to a process for purifying organic compounds and more particularly to the removal of contaminants from organic liquids commonly used in the preparation of lacquers.

In the preparation of clear lacquers for certain purposes, particularly in the safety glass industry, it is essential that the lacquers remain clear for prolonged periods of time. It has been found that this can be accomplished to some extent by bringing the liquid ingredients in contact with activated carbon. When this is done, however, certain contaminants are imparted to the liquid presumably from the carbon. Cellulose derivative adhesive or lacquer films produced from compositions in which such liquids have been used as solvents or diluents are very apt to develop dark blemishes or stains in time. Such stains are not particularly objectionable in colored lacquers or in adhesive films which are not seen; but, where they are used to join the laminations of safety glass, adhesives or lacquers so produced are unsatisfactory. Many chemical methods have been proposed for the removal of such contaminants whether they were imparted to the liquid through the activated carbon or in their initial preparation. Among the proposed methods are the treatment of such liquids with copper, mercury, or zinc in the powdered form. These are not satisfactory for the reason that a very long time is required for the treatment of the liquids.

Another method which has been proposed involves blowing the organic liquids with a current of air. This method is not practical for the reason that a large amount of vapor is carried away and its recovery is thereby necessitated. If the temperature is increased to shorten the time of blowing, an increase in color and acidity is invariably produced. The present invention has as an object the provision of a method of removing contaminants from lacquer ingredients which is cheap and efficient. A further object is a process for removing contaminants from organic liquid solvents, diluents, and plasticizers for cellulose derivative lacquers which have been treated with activated charcoal. A still further object of this invention is the provision of a method which not only removes contaminants, but neutralizes and dries organic liquids in a simple and expeditious manner. Other objects will be apparent as the description of the invention proceeds.

These objects are obtained according to the present invention by treating the organic liquids of the class mentioned above with powdered lime under certain conditions.

As suggested above, plasticizers such as dimethyl phthalate, diethyl phthalate, dimethyl cellosolve phthalate, and dibutyl phthalate which are commonly used in the manufacture of transparent cellulose derivative sheeting that forms one of the laminations in safety glass must be "water-white" and must remain in this condition for extended periods of time. Ordinarily, this is accomplished by passing the ester through activated carbon. After the liquid is passed through, it is usually "water-white" but it has been found that for some reason this treatment aggravates the tendencies toward discoloration with the passage of time. The foreign material present in the ester whether absorbed or whether present initially usually amounts to less than 0.1% of the weight of the ester. A complete analysis of the foreign matter is relatively difficult due to the amounts in which it is present. It has been found that at least part of this material contains sulphur either in the elemental form or combined as mercaptans. However, the material which is responsible for the subsequent discoloration of the cellulose derivative film may be removed by shaking the liquid with about 5% of its weight of powdered lime. This treatment is usually carried out at a temperature of about 80° C. to 90° C., for about two hours. In some cases, less time is required and in others more time is necessary. An approximate indication of a satisfactory length of time for treatment may be obtained by adding a drop of mercury to the treated ester. If the mercury remains bright, the treatment has been sufficient. If it tarnishes or is otherwise discolored, the treatment should be prolonged. The lime is usually in the form of CaO; that is, quick lime. When used in this form, any traces of water will be removed as well as any free acid. The lime may then be removed by ordinary filtration and the liquid is ready for use.

The invention is not restricted to the purification of the esters mentioned above, but is adapted to the treatment of other such esters which are solvent plasticizers for cellulose derivative films. In addition to liquids of this class, other compounds such as diluents; for example, naphtha, xylene, kerosene, gasolines, and other aliphatic and aromatic hydrocarbons may be treated with success. It has also been found that solvents such as the lower alkyl acetates, alcohols, etc., may be purified as indicated above. When low boiling liquids of this class are treated, the temperature is not raised to 80° C. or 90° C., but is carried out at about room temperature.

When the process is applied to hydrocarbons, it may be necesary to raise the temperature above the range indicated above. For example, in the purification of kerosene, it has been found that it is necessary to heat the mixture to about 125° C., to obtain the desired results within a reasonable time. In the treatment of most hydrocarbons, however, lower temperatures were satisfactory.

While it has been indicated that 5% of lime based on the weight of the liquid treated is usually sufficient, it will be obvious that where the percentage of contaminants is unusually high or there is considerable acid or moisture present in the liquid it is necessary to increase the percentage of lime. In any event, whether the lime is increased or whether the liquid is subjected to repeated treatments, the test with mercury will indicate when the liquid is free from contaminants. This test is extremely sensitive.

While it has been indicated that quick lime is preferred, the process may also be carried out with slaked lime.

It will also be apparent that other oxides or hydroxides having the same action may be used.

The process herein described is very simple and inexpensive and results in the preparation of cellulose derivative films which retain their transparency and clearness for indefinitely long periods of time. Such cellulose derivative films are particularly adapted for use in the production of safety glass. The liquids so treated are also adapted for use in other clear cellulose derivative compositions such as adhesive lacquers and the like whether colorless or colored. Colored lacquers prepared from treated liquids retain their brilliancy and pure color.

It is apparent that many widely different embodiments of this invention may be made without departing from the spirit and scope thereof; and, therefore, it is not intended to be limited except as indicated in the appended claims.

I claim:

1. In the process for purifying colorless organic liquid solvents, plasticizers, and diluents for lacquers wherein the liquid is decolorized with activated carbon the improvement which comprises agitating the liquid with about 5% of its weight of powdered quick lime at a temperature of 80° C. to 90° C. for about two hours.

2. Process for purifying liquid phthalic acid esters, wherein the ester is decolorized with activated carbon, the step which comprises agitating the ester with about 5% of its weight of powdered lime, at a temperature of about 90° C., for about two hours.

VIRGIL WALDO WARE.